United States Patent
Bai et al.

(10) Patent No.: US 12,501,334 B2
(45) Date of Patent: Dec. 16, 2025

(54) TRANSMISSION CONFIGURATION INDICATOR STATE SET PRECONFIGURATION IN CANDIDATE CELLS

(71) Applicant: QUALCOMM Incorporated, San Diego, CA (US)

(72) Inventors: Tianyang Bai, Somerville, NJ (US); Yan Zhou, San Diego, CA (US); Jing Sun, San Diego, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 546 days.

(21) Appl. No.: 17/937,129

(22) Filed: Sep. 30, 2022

(65) Prior Publication Data

US 2024/0114411 A1 Apr. 4, 2024

(51) Int. Cl.
*H04W 36/08* (2009.01)
*H04W 36/00* (2009.01)

(52) U.S. Cl.
CPC ....... *H04W 36/08* (2013.01); *H04W 36/0033* (2013.01); *H04W 36/0085* (2018.08)

(58) Field of Classification Search
CPC ............ H04W 36/362; H04W 36/08; H04W 36/0083; H04W 36/0033; H04W 36/24; H04W 36/0058; H04W 36/0061; H04W 36/0085; H04W 36/0055
See application file for complete search history.

(56) References Cited

U.S. PATENT DOCUMENTS

| 2017/0195033 | A1* | 7/2017 | Zhang | H04W 76/10 |
| 2021/0135802 | A1* | 5/2021 | Zhou | H04B 7/0617 |
| 2023/0189284 | A1* | 6/2023 | Cheng | H04W 24/10 |
| | | | | 370/329 |
| 2024/0243885 | A1* | 7/2024 | Zheng | H04W 72/231 |
| 2024/0406811 | A1* | 12/2024 | Zhang | H04W 36/0058 |

* cited by examiner

*Primary Examiner* — Allahyar Kasraian
(74) *Attorney, Agent, or Firm* — Patterson+ Sheridan, L.L.P.

(57) ABSTRACT

Certain aspects of the present disclosure provide techniques for a user equipment (UE) to receive, via a first active cell serving the UE, a first control message activating a set of transmission configuration indicator states associated with a set of candidate cells that are inactive at the UE. The UE may receive, via the first active cell after receiving the first control message, a second control message indicating for the UE to switch to a second cell of the set of candidate cells. In response to receiving the second control message indicating for the UE to switch to the second cell, the UE may switch to communicating with the second cell using a first transmission configuration indicator state of the activated set of transmission configuration indicator states.

28 Claims, 11 Drawing Sheets though many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

TRANSMISSION CONFIGURATION INDICATOR STATE SET PRECONFIGURATION IN CANDIDATE CELLS

BACKGROUND

Field of the Disclosure

Aspects of the present disclosure relate to wireless communications, and more particularly, to techniques for transmission configuration indicator state set preconfiguration in candidate cells.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communications by a user equipment (UE). The method includes receiving, from a network entity via a first active cell serving the UE, a first control message activating a set of transmission configuration indicator states associated with a set of candidate cells that are inactive at the UE; receiving, via the first active cell after receiving the first control message, a second control message indicating for the UE to switch to a second cell of the set of candidate cells; and switching to communicating with the second cell using a first transmission configuration indicator state of the activated set of transmission configuration indicator states responsive to receiving the second control message indicating for the UE to switch to the second cell.

Another aspect provides a method for wireless communications by a network entity. The method includes transmitting, to a UE via a first active cell serving the UE, a first control message activating a set of transmission configuration indicator states associated with a set of candidate cells that are inactive at the UE; and transmitting, after transmitting the first control message, a second control message indicating for the UE to switch to a second cell of the set of candidate cells.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

DETAILED DESCRIPTION

Figure 1:
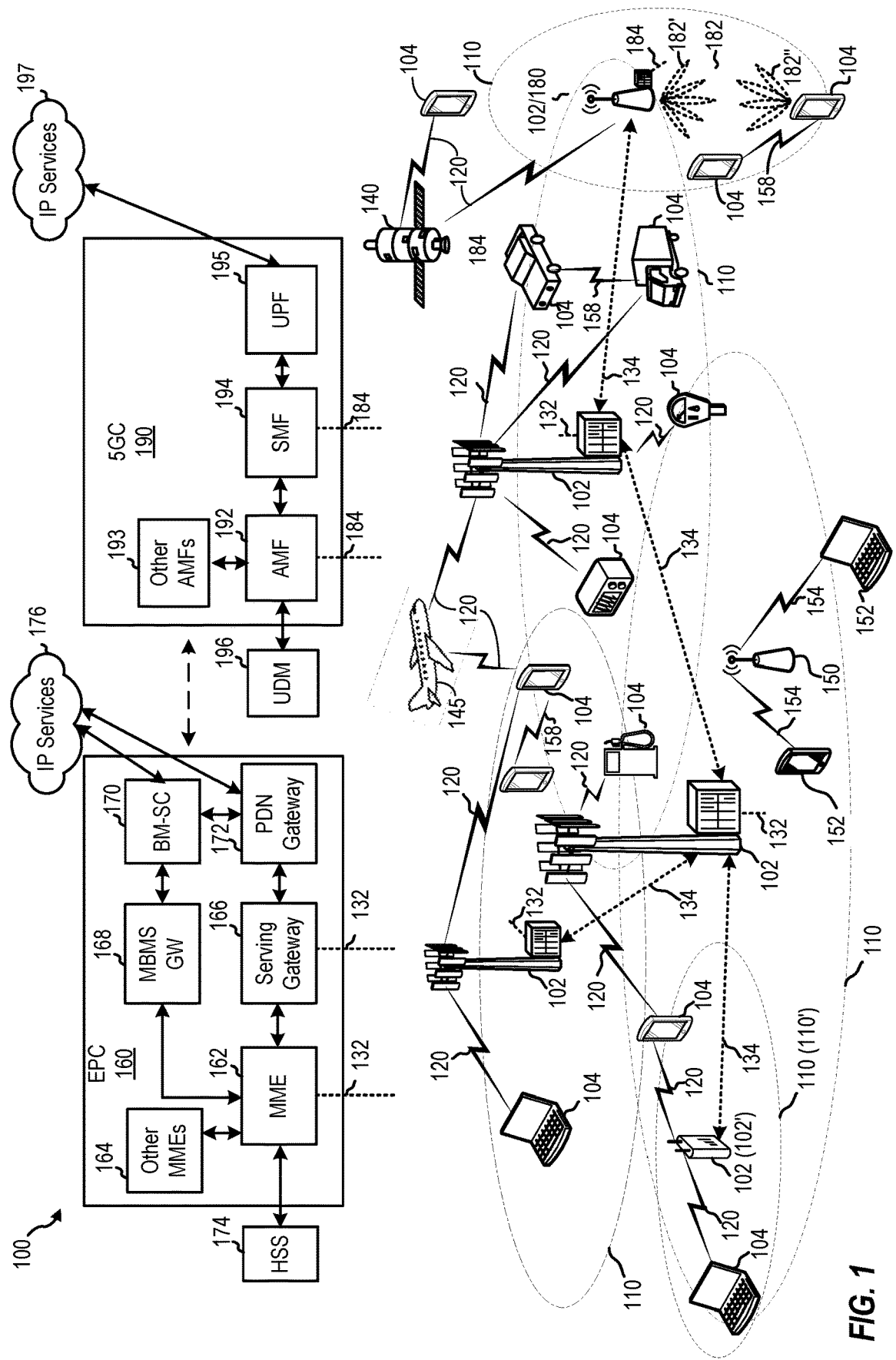
FIG. 1 depicts an example wireless communications network.

Aspects of the present disclosure provide apparatuses, methods, processing systems, and computer-readable mediums for transmission configuration indicator state set preconfiguration for candidate cells.

A UE (e.g., UE 104) communicating with a network entity (e.g., base station, such as base station 102, or RU, such as RU 240) may have a communication link (e.g., communication link 120) with one or more cells served by the network entity. For example, the UE may have a communication link with a primary cell (PCell). In some configurations, such as in carrier aggregation (CA), the UE may have a communication link with a PCell and one or more secondary cells (SCells). In another example, such as a dual connectivity configuration (which may be a specific example of carrier aggregation), the UE may have a communication link with a PCell and zero or more SCells in one cell group (e.g., with or via a first network entity, such as a base station or RU), as well as a communication link with a second primary cell (e.g., a secondary primary cell (SpCell)) and zero of more SCells in a second cell group (e.g., with or via a second network entity, such as a base station or RU). The first cell group may be referred to as a primary or master cell group (MCG), and the second cell group may be referred to as a secondary cell group (SCG).

The UE may be configured with a set of one or more transmission configuration indicator (TCI) states for the UE to use to communicate with a cell. Each TCI state may include a configuration for the UE, such as a quasi co-location (QCL) relationship between antenna ports for downlink reference signals (e.g., SSB, CSI-RS) and PDSCH DMRS antenna ports. Two antenna ports may be said to be QCLed if properties of the channel over which a symbol on one antenna port is conveyed can be inferred from the channel over which a symbol on the other antenna port is conveyed. QCL may refer to one or more of a Doppler shift, Doppler spread, average delay, delay spread, or spatial receive parameter for beam forming. The network entity may configure the UE with multiple TCI states via control signaling (e.g., via RRC signaling). The network entity may then activate (e.g., via a MAC control element (MAC CE)) a set of TCI states for the UE, where the network entity may then indicate for the UE to use one or more of the TCI states of the set of TCI states in a DCI message.

A UE may perform a mobility procedure to change serving cells (e.g., PCell to SCell, SCell to PCell), for example a layer 1 (L1) or layer 2 (L2) mobility procedure, which may include mobility between cells (e.g., inter-cell mobility). In some examples, the serving cell change may be performed individually per cell. For example, a PCell may be changed to an SCell, or an SCell to a PCell. In other examples, the serving cell change or changes may be applicable to a group of cells, for example a SpCell and SCell may together be switched in a CA configuration. As part of the mobility procedure, the UE may also switch to using a set of TCI states for the first cell (the former cell) to a second set of TCI states for the second cell (the new call). As part of the mobility procedure, the network entity may activate the second cell. After the second cell is activated, the network entity may activate a set (e.g., list) of TCI states for the new cell using one or more control messages (e.g., a MAC CE). However, before a TCI state may be selected by the network entity (e.g., via a DCI message selecting a TCI state of the set of TCI states), the UE may need to perform a measurement procedure for one or more reference signals associated with the TCI state so that the UE can use the TCI for uplink or downlink communications.

In an example of downlink, the UE may receive an indication (e.g., a MAC CE) to activate a set of TCI states at a first time, and send an acknowledgement of the received indication. The UE may have an amount of time to apply the received indication (e.g., about 3 ms). For downlink, the UE may measure a synchronization signal block (SSB) associated with each TCI state. Following the application time for the received indication, the UE may await an occasion for the SSB associated with the TCI state. The UE may then use an amount of measurement and processing time (e.g., about 2 ms) before the TCI state is available for selection by the network entity via a DCI message.

In an example of uplink, the UE may similarly receive an indication to activate a set of TCI states, send an acknowledgement, and have an amount of time to apply the received indication. For uplink, the activation time may be longer than for downlink. To perform uplink transmission, the UE may monitor pathloss reference signals associated with the uplink TCI to estimate pathloss of the uplink. The estimated pathloss may then be used in uplink power control. For example, the UE may measure multiple pathloss reference signals (e.g., multiple SSBs or CSI-RS s) associated with different TCI states of the set of states. For example, following the application time for the received indication, the UE may await a set of occasions for the pathloss reference signals (e.g., SSBs or CSI-RSs) associated with the TCI state. The UE may then use an amount of measurement and processing time (e.g., about 2 ms) before the TCI state is available for selection by the network entity via a DCI message for uplink transmissions. In some examples, the UE may take an average of the measured pathloss based on the multiple pathloss reference signals.

As such, there may be excess latency between when a new cell is activated for a UE, and a set of TCI states are available to be selected by the network entity in the new cell (e.g., via DCI). For example, even where there is an otherwise fast cell switch from an old cell to a new cell, a TCI state to be used for transmission or reception in the new cell may not be available quickly, and the TCI state activation time may be a bottleneck for fast cell switching.

Techniques are provided where a UE may be served by a first active cell. The UE may receive a first control message activating a set of TCI states that are associated with a set of inactive candidate cells at the UE, for example while the UE is still being served by the first active cell The inactive candidate cells may be candidate cells identified for a mobility procedure. Having received the set of TCI states for the set of inactive candidate cells, the UE may track reference signals, such as SSBs, that correspond to the TCIs of the set of TCIs for the inactive candidate cells. The UE may then receive an indication for the UE to switch to a second cell that is one of the inactive candidate cells. The UE may then switch to the second cell and proceed to communicate with the second cell using one of the TCI states, a first TCI state, of the set of TCI states indicated to the UE while the UE was still communicating with the first cell. For example, the UE may receive a DCI message selecting, indicating, or otherwise identifying the first TCI state, and the UE may proceed to communicate using the first TCI state based on the set of TCI states activated while the UE was communicating with the first cell, for example. In some examples, the UE may be prepared to receive and receive the DCI message selecting the first TCI state from the set of TCI states without the UE having received signaling activating a set of TCI states for the UE associated with the second cell while the second cell is active for the UE.

Because the UE has already been tracking reference signals associated with the TCI states, for example by determining a metric associated with the TCI state by measuring the reference signal associated with or otherwise corresponding to the TCI state, the UE may be prepared to receive a DCI message selecting the TCI state for use by the UE with less latency than prior techniques. The UE may thus perform a relatively faster mobility procedure, increasing throughput and communication efficiency, and reducing communications disruptions.

In some examples, the UE may provide UE capability signaling to the network indicating a capability of the UE to be preconfigured with a set of TCI states for inactive candidate cells for mobility procedures. Additionally, or alternatively, the UE may indicate a maximum quantity of TCI states for deactivated cells that the UE can support, for example a per component carrier limit, a per band or bandwidth limit, and so on. The UE capability may be specific to inactive candidate cells, may be a generalization of the UE capability for active cells to also include inactive candidate cells, or may be included as a part of the UE capability for active cell. The UE capability may allow the network to appropriately communicate TCI states to the UE for mobility, and provide for backward compatibility for legacy UEs.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
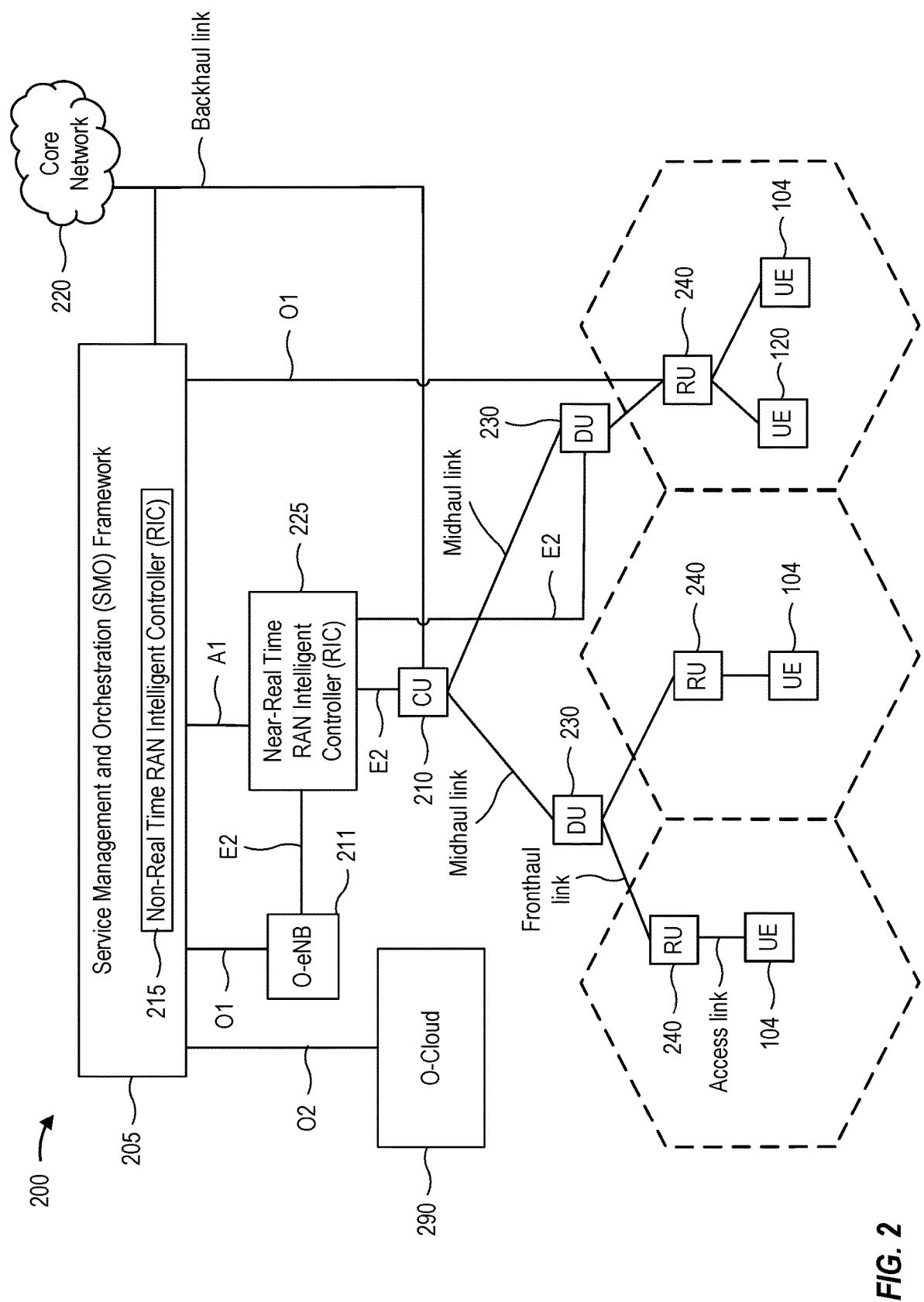
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-52,600 MHz, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (MC) 225 via an E2 link, or a Non-Real Time (Non-RT) MC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via 01) or via creation of RAN management policies (such as A1 policies).

Figure 3:
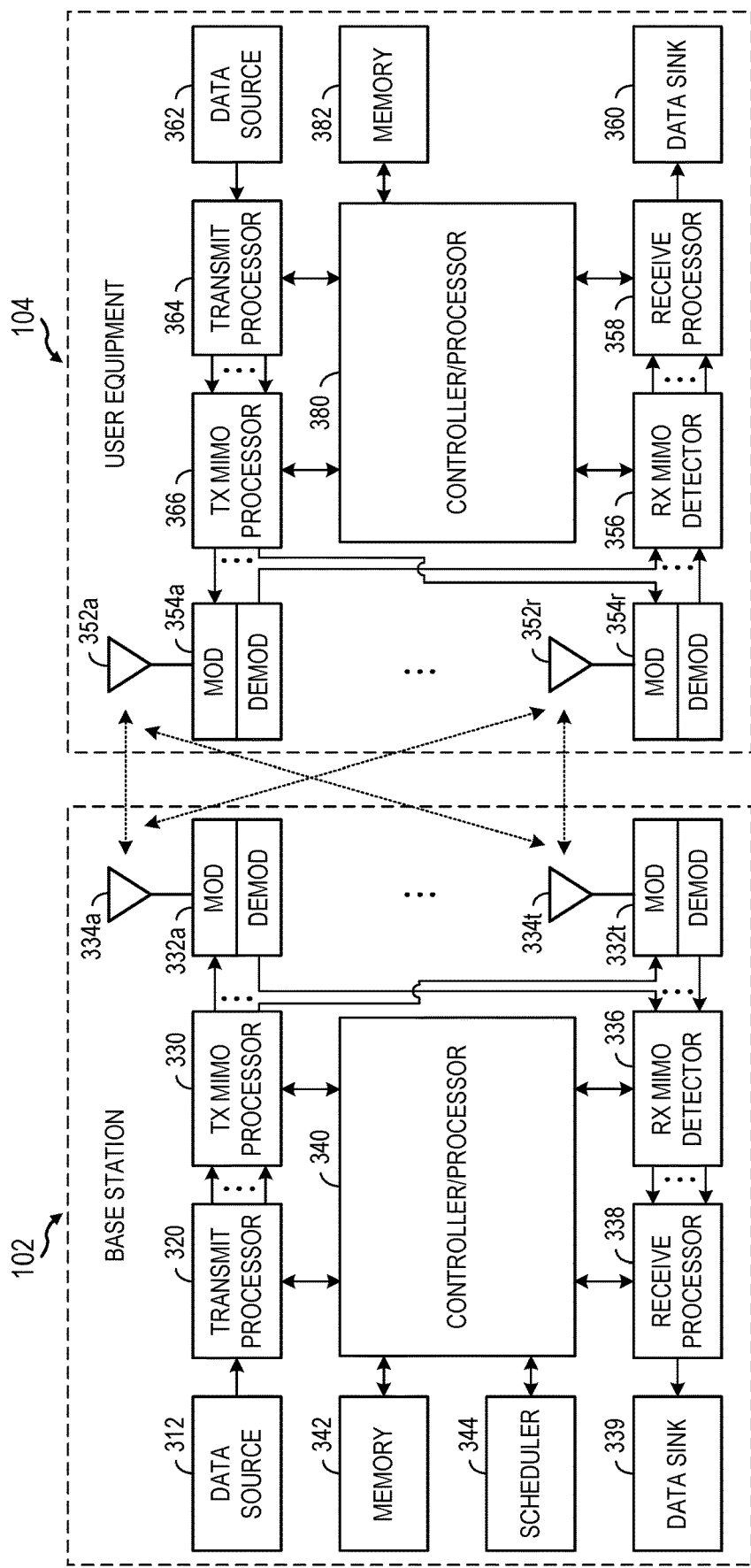
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352a-r (collectively 352), transceivers 354a-r (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figure 4:
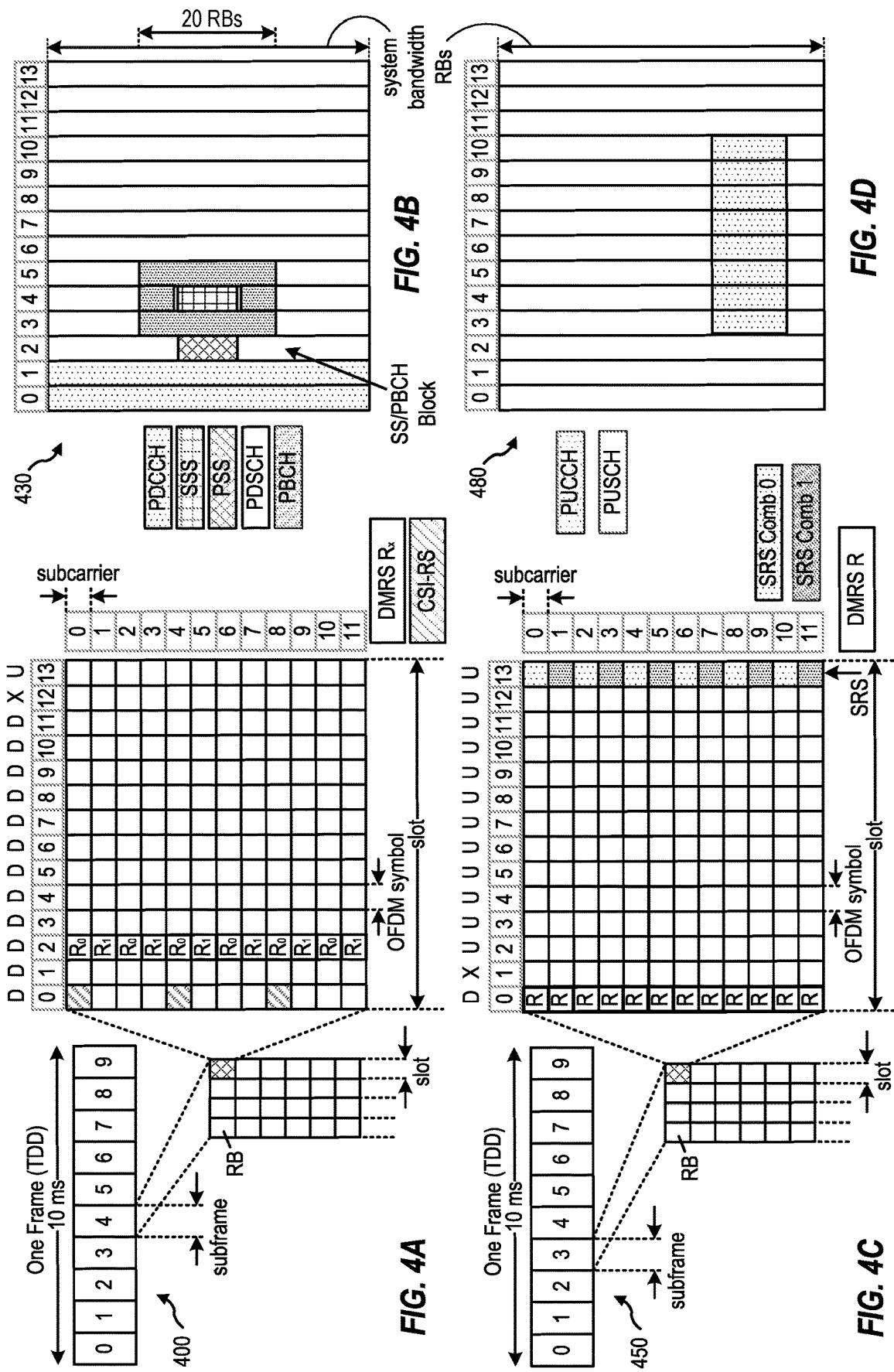
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of sub carriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^\mu \times 15$ kHz, where μ1, is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 5:
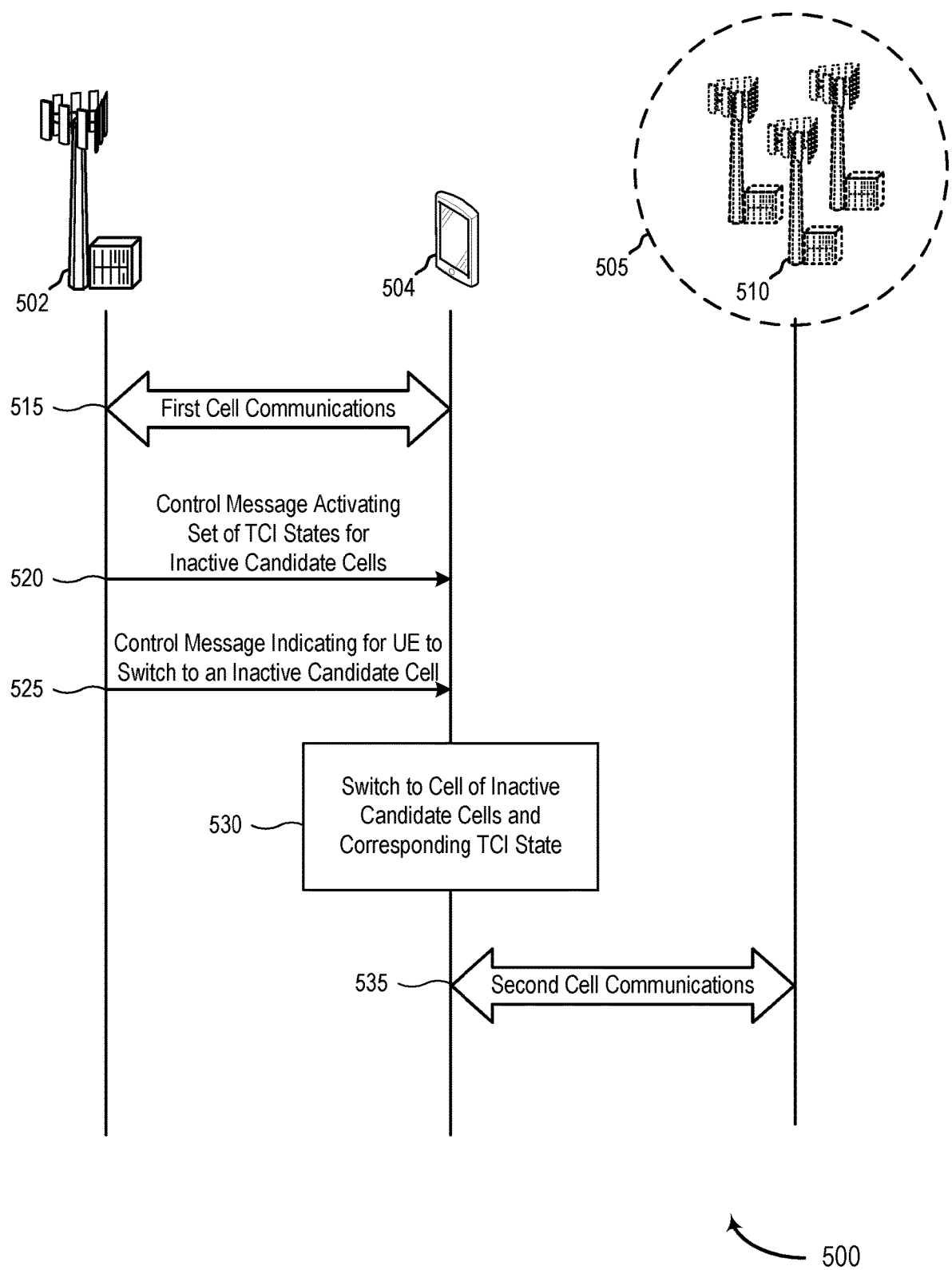
FIG. 5 depicts a process flow for communications in a network between a UE and a network entity serving a first cell and second network entity serving a second cell.

Aspects Related to Transmission Configuration Indicator State Set Preconfiguration for Candidate Cells Example Operations of Entities in a Communications Network FIG. 5 depicts a process flow 500 for communications in a network between a network entity 502, a UE 504, and a network entity 510. In some aspects, the network entity 502 may be an example of the BS 102 depicted and described with respect to FIGS. 1 and 3 or a disaggregated base station depicted and described with respect to FIG. 2. Similarly, the UE 504 may be an example of UE 504 depicted and described with respect to FIGS. 1 and 3. However, in other aspects, UE 504 may be another type of wireless communications device and BS 102 may be another type of network entity or network node, such as those described herein. Network entity 502 may serve a first cell, which may be an active cell or an inactive cell (which may also be referred to a deactivated cell) with reference to UE 504. Network entity 502 may also serve one or more other cells for UE 504 or other UEs.

Network entity 510 may serve one or more cells, including a second cell, which are candidate cells for the UE for purposes of a mobility procedure. Network entity 510 may be one of a group 505 of network entities serving candidate cells for the UE. Although illustrated as physically separate, base station stations that serve cells that 102 and network entity 510 may be co-located. For example, network entity 502 may serve a first set of cells and network entity 510 may serve a second set of cells, but network entity 502 and network entity 510 may be a same physical base station.

Process flow 500 may include first cell communications 515 between network entity 502, which may be an example of a network entity, and UE 504. For example, UE 504 may communicate with network entity 502 via a PCell served by network entity 502. Network entity 502 may also serve UE 504 using one or more SCells. In other examples, the first cell may be a SpCell, and network entity 502 may serve UE 504 using one or more SCell associated with the SpCell.

At 520, network entity 502 may transmit and UE 504 may receive a control message activing a set of TCI states associated with a set of candidate cells that are inactive at the UE 504. The inactive candidate cells may include cells that are candidates (e.g., one or more SCells, SpCells, or a combination thereof) to become an active cell for the UE 504 as a result of a mobility procedure. For example, network entity 502 may identify or select a set of cells that the UE 504 could be switched to by the network entity 502.

At 525, after receiving the first control message, the network entity 502 may transmit and the UE 504 may receive a second control message via the first active cell. The second control message may indicate for the UE to switch to a second cell of the set of candidate cells.

At 530, the UE 504 may switch to the second cell in response to the second control message received at 525. The UE 504 may also identify a set of TCI states corresponding to the second cell based on the control message received at 520 that activated the set of TCI states. The UE 504 may then identify one the TCI states for communication with the second cell.

After a TCI state is identified at the UE 504 for communications with the second cell, for example served by network entity 510, UE 504 and network entity 502 may perform second cell communications 535 between UE 504 and network entity 502.

Figure 6:
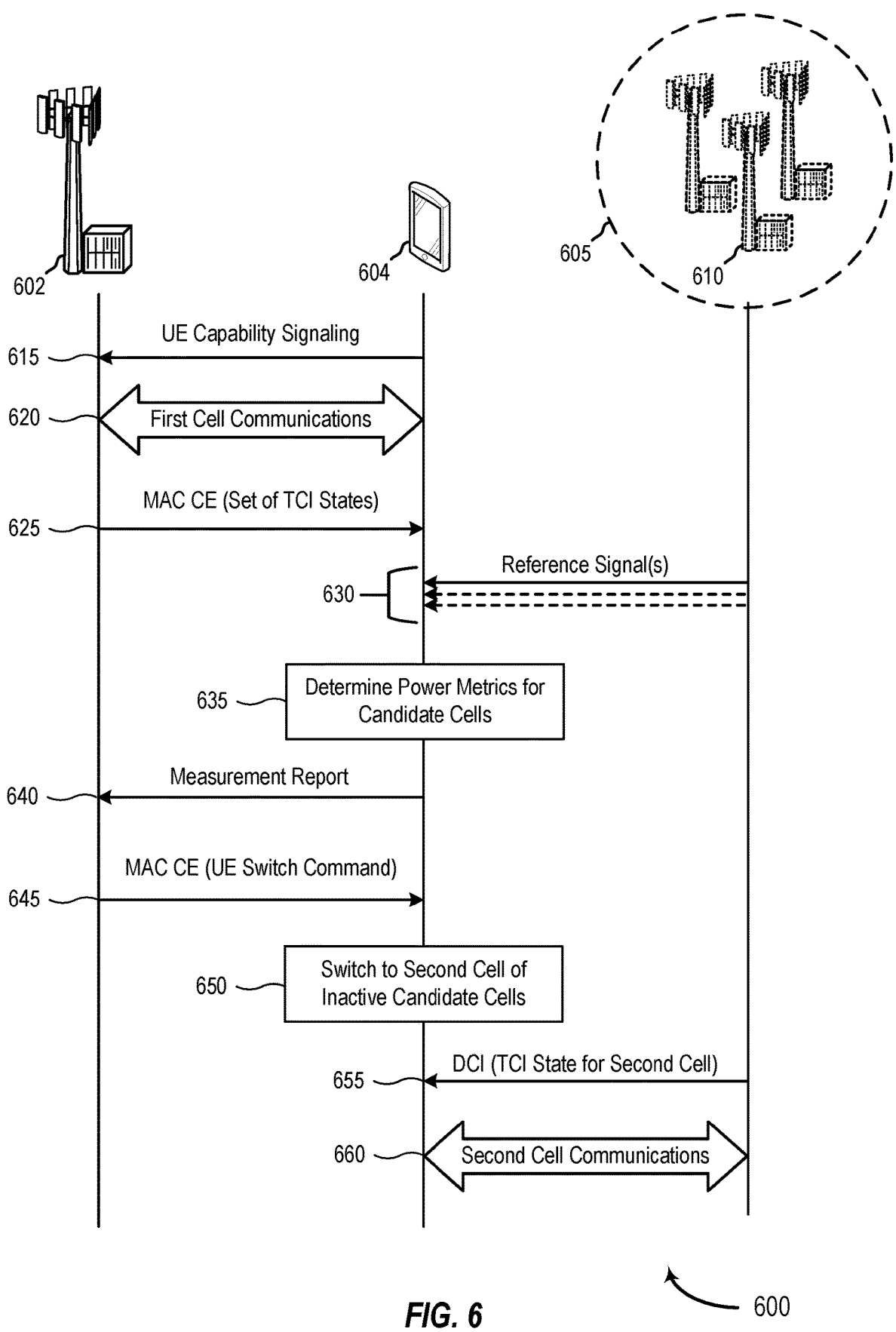
FIG. 6 depicts a process flow for communications in a network between a UE and a network entity serving a first cell and second network entity serving a second cell.

FIG. 6 depicts a process flow 600 for communications in a network between a network entity 602, a UE 504, and a network entity 510. In some aspects, the network entity 502 may be an example of the BS 102 depicted and described with respect to FIGS. 1 and 3 or a disaggregated base station depicted and described with respect to FIG. 2. Similarly, the UE 604 may be an example of UE 104 depicted and described with respect to FIGS. 1 and 3. However, in other aspects, UE 604 may be another type of wireless communications device and BS 102 may be another type of network entity or network node, such as those described herein. Network entity 602 may serve a first cell, which may be an active cell or an inactive cell (which may also be referred to a deactivated cell) with reference to UE 604. Network entity 602 may also serve one or more other cells for UE 604 or other UEs.

At 615, UE 604 may transmit UE capability signaling to the network, for example via network entity 502. The UE capability signaling may be provided as RRC signaling, for example in a UE capability information message transmitted by the UE 604 in response to a UE capability enquiry message received from the network entity 602. The UE capability information message may be provided to the network during an initial registration process. The UE 604 may indicate in the UE capability signaling a quantity of TCI states for inactive candidate cells. For example, the quantity (number, value) of TCI states may represent a maximum number of active TCI states that the UE 604 can track or otherwise manage for inactive candidate cells. The UE 604 may track downlink reference signal (e.g., SSB, CSI-RS) associated with the TCI states for the inactive candidate cells, which may use energy and processing resources of UE 604. As such, a UE 604 may provide a limit on the number of active TCI states.

A UE 604 may transmit UE capability signaling identifying a quantity of active TCI states for active cells. In some examples, the UE capability signaling identifying the quantity of active TCI states for inactive candidate cells may be new capability signaling distinct from the UE capability signaling for active cells (e.g., a separate and distinct field, parameter, or information element). In other examples, the UE capability signaling for active cells may be generalized to include both the active cells and the inactive candidate cells (e.g., a single field, parameter, or information element including both quantities). In still other examples, the definition of the quantity of active TCI states may include both UE capability for active cells and inactive candidate cells. That is, the definition of the UE capability signaling may cover both the quantity of active cells and the quantity of inactive candidate cells.

In some example the UE capability signal may indicate a quantity of pathloss reference signals (e.g., downlink reference signals, such as SSB, CSI-RS, or a combination thereof) that the UE 604 is capable of tracking for inactive candidate cells. Additionally, or alternatively, the UE capability signaling may indicate whether a measurement time to measure N times (instances) of the pathloss reference signal is to be performed before the pathloss reference signal is ready for the inactive candidate cell (e.g., in the deactivated cell case).

Process flow 600 may include first cell communications 620 (e.g., PDSCH, PDCCH, PUSCH, or PUCCH communications) between network entity 602 and UE 604, which may be an example of first cell communications 515.

At 625, network entity 602 may transmit and UE 604 may receive a MAC CE (e.g., a TCI state activation/deactivation MAC CE) activing a set of TCI states associated with a set of candidate cells that are inactive at the UE 604. The inactive candidate cells may include cells that are candidates (e.g., one or more SCells, SpCells, or a combination thereof) to become an active cell for the UE 604 as a result of a mobility procedure. For example, network entity 602 may identify or select a set of cells that the UE 604 could be switched to by the network entity 602. The MAC CE may identify one or more TCI states corresponding each cell of the inactive candidate cells. For example, the MAC CE may include a bitmap that activates or deactivates each TCI state of a larger set TCI states that were previously identified to the UE 604, for example in a PDSCH configuration message via RRC signaling. As a result of the MAC CE, UE 604 may be informed of a set of TCI states (e.g., a subset of the larger set of TCI states) that may be selected for the UE 604 via a DCI message after the UE 604 switches to one of the cells of the inactive candidate cells. In some examples, the MAC CE may identify the serving cell or serving cells (e.g., one or more of the inactive candidate cells) to which the MAC CE applies. While discussed with reference to a single MAC CE, multiple MAC CEs may be used in some examples to activate the set of TCI states for the inactive candidate cells, for example one MAC CE per inactive candidate cell. Additionally, or alternatively, a single MAC CE may be used for a group of inactive candidate cells.

The MAC CE may identify a bandwidth part to which the TCI activation of the MAC CE applies (e.g., for a corresponding serving cell). In some examples, explicit signaling of a bandwidth part may be used. For example, a MAC CE for active cells may also be used for the inactive cells, where a bandwidth part identifier (ID) field of the MAC CE for active cells may interpreted as the target bandwidth part ID on the inactive candidate cells (deactivated cells). In another example, implicit signaling of a bandwidth part may be used. For example, UE 604 may interpret or otherwise understand that a MAC CE activated TCI states that UE 604 received for an inactive candidate cell is to be associated with a default (fixed, preconfigured) bandwidth part as an initial bandwidth part to be used by UE 604 for the inactive candidate cell (e.g., once the inactive candidate cell becomes the active cell following the receipt of a cell switch command at UE 604 indicating the previously-inactive candidate cell).

In some examples, network entity 602 may transmit and UE 604 may receive signaling (e.g., an activation command) activating pathloss reference signals (e.g., downlink reference signals, such as SSB, CSI-RS, or a combination thereof) that the UE 604 is capable of tracking for inactive candidate cells. The signaling activating the pathloss reference signals may indicate, for an associated inactive candidate cell, a bandwidth part of the pathloss reference signals in the inactive candidate cell.

At 630, the UE 604 may receive and measure (track) reference signals from network entity 610, or multiple network entities of the group 605, serving cells of the inactive candidate cells. In some examples the reference signals may be beamformed reference signals.

At 635, the UE 604 may determine, for each cell of the set of inactive candidate cells, a power metric for a set of reference signals (e.g., beamformed reference signals, including pathloss reference signals, such as SSBs or CSI-RS) associated with the cell. The network may configure TCI states in the inactive candidate cells based on reports of a power metric (e.g., a reference signal received power (RSRP)). In some examples, the UE 604 may monitor the reference signals from the inactive candidate cells and report a layer 1 RSRP value for each cell of the inactive candidate cells. However, such monitoring may use undue overhead, decreasing availability of the medium and decreasing communications efficiency. As such, in some example, UE 604 may select a subset of cells of the set of candidate cells based on the power metric for the set of reference signals, which may be cells of the inactive candidate cells whose quality meets a threshold value may report a power metric. The network may limit its consideration to activating TCI states on such cells in some examples. A power metric may mitigate frequent cell switch and reduce L1 report overhead, for example, where an L1 cell-level metric may be used and defined as linear average of X>1 best beams per cell, for example, X=2 or X=3. The power metric may jointly reflect a best beam quality and intra-cell beam diversity offered per cell of the inactive candidate cells.

In some examples, the power metric may be a linear average of power measurements for a threshold quantity of the set of beamformed reference signals. For example, the power metric for a cell may be a linear average of RSRPs for X top reference signals in each cell whose RSRP is above a threshold power. The value of X may be configurable (e.g., indicated to UE 604 by network entity 602). In other examples, the value of X may be a defined (static, pre-defined) value that is fixed at UE 604. The averaging of power measurements (e.g., RSRPs) may be performed in the linear domain in some example. In other examples, the averaging of power measurements (e.g., RSRPs) may be performed in a decibel domain.

In another example, the power metric may be a tail percentage of power measurements for a threshold quantity of the set of beamformed reference signals. The power metric for a cell may be a tail percentage of RSRPs in X top reference signals, for example, an RSRP corresponding to a worst (Y percentage) among the power metrics of the top X beams. The values of X and Y may be configurable or defined at UE 604.

In another example, the UE 604 may identify a ranked order for the set of candidate cells based on the power metric for the set of beamformed reference signals, and select a subset of cells based on a threshold quantity of cells and the ranked order. For example, the UE may compute the cell metric in each deactivated cell, and limit reporting to the top A cells' measurements to the network based on the ranking of the cell metric.

At 640, UE 604 may transmit or otherwise provide a report (e.g., measurement report) indicating a received power (e.g., RSRP) measurement for each cell of the selected subset of cells. The report may be transmitted based on the UE 604 identifying that a trigger condition has been met. For example, the report may be event triggered such that when a cell's metric is above threshold, UE 604 sends such report to network entity 602.

At 645, network entity 602 may transmit and UE 604 may receive a MAC CE (e.g., a UE switch command MAC CE) indicating for the UE to switch to a second cell of the set of candidate cells.

At 650, the UE 604 may switch to the second cell in response to the second control message received at 645.

At 655, the UE 604 may receive, from network entity 602 via the second cell, a DCI message indicating the first TCI state. For example, network entity 602 may select a TCI state for the UE 604 to use for communications (e.g., PDSCH, PDCCH, PUSCH, or PUCCH communications) with the network entity 602 via the second cell, and indicate the selected TCI state to the UE 604 in a DCI message.

The UE 604 may perform second cell communications 660 (e.g., PDSCH, PDCCH, PUSCH, or PUCCH communications) between UE 604 and network entity 602 via the second cell using the first TCI state.

Figure 7:
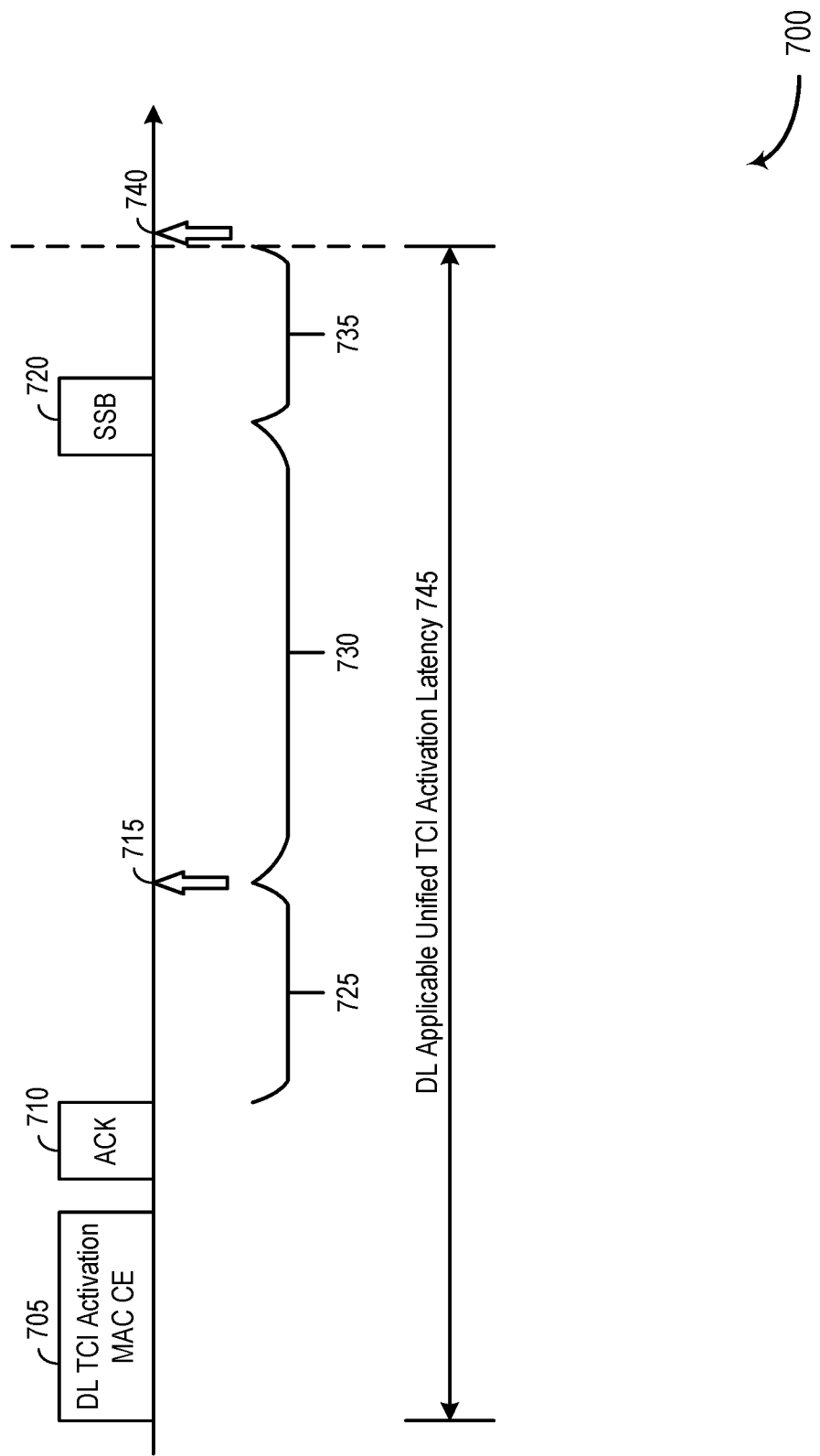
FIG. 7 depicts a timeline illustrating TCI activation delay.

FIG. 7 depicts a timeline 700 illustrating TCI activation delay, for example for downlink TCI activation.

Following the activation of a new cell for a UE, at 705, a network entity may transmit and the UE may receive a control message 705 that activates a set or list of TCI states, for example TCI states application for downlink communications, for use at the UE. The control message may be a MAC CE, as further discussed herein. The UE may respond to the network entity with an acknowledgement 710 responsive to the control message 705. After the set or list of TCI states is activated, following time 740 the network entity may use a DCI to select a TCI of the set or list of TCI states for PDSCH transmission, PDCCH transmission, PUSCH transmission, PUCCH transmission, or a combination thereof.

According to some current techniques, the activation time may include a time duration 725 that is associated with a time duration prior to when the control message 705 (e.g., MAC CE) becomes applicable the UE at time 715. There may then be a time duration 730 from the time 715 until a next SSB occasion 720 when the UE may receive and measure an SSB (e.g., a downlink reference signal of the SSB) that is QCLed with a TCI state activated by the control message 705. There may then be a time duration 735 following the SSB occasion 720 during which the UE processes the SSB.

For multiple TCI states activated by the control message 705, there may be multiple different SSB occasions, each TCI state of the set of activated TCI states QCLed with an SSB occasion. The UE may then receive a measure and measure SSBs on one or more different SSB occasions, which may increase a duration of time duration 730.

In view of the above, the latency 745 for application of the activated set of TCI states (e.g., the downlink applicable unified TCI activation latency) may be relatively long. According to the techniques described herein, the latency 745 may be reduced or eliminated by applying transmission configuration indicator state set preconfiguration in candidate cells.

Figure 8:
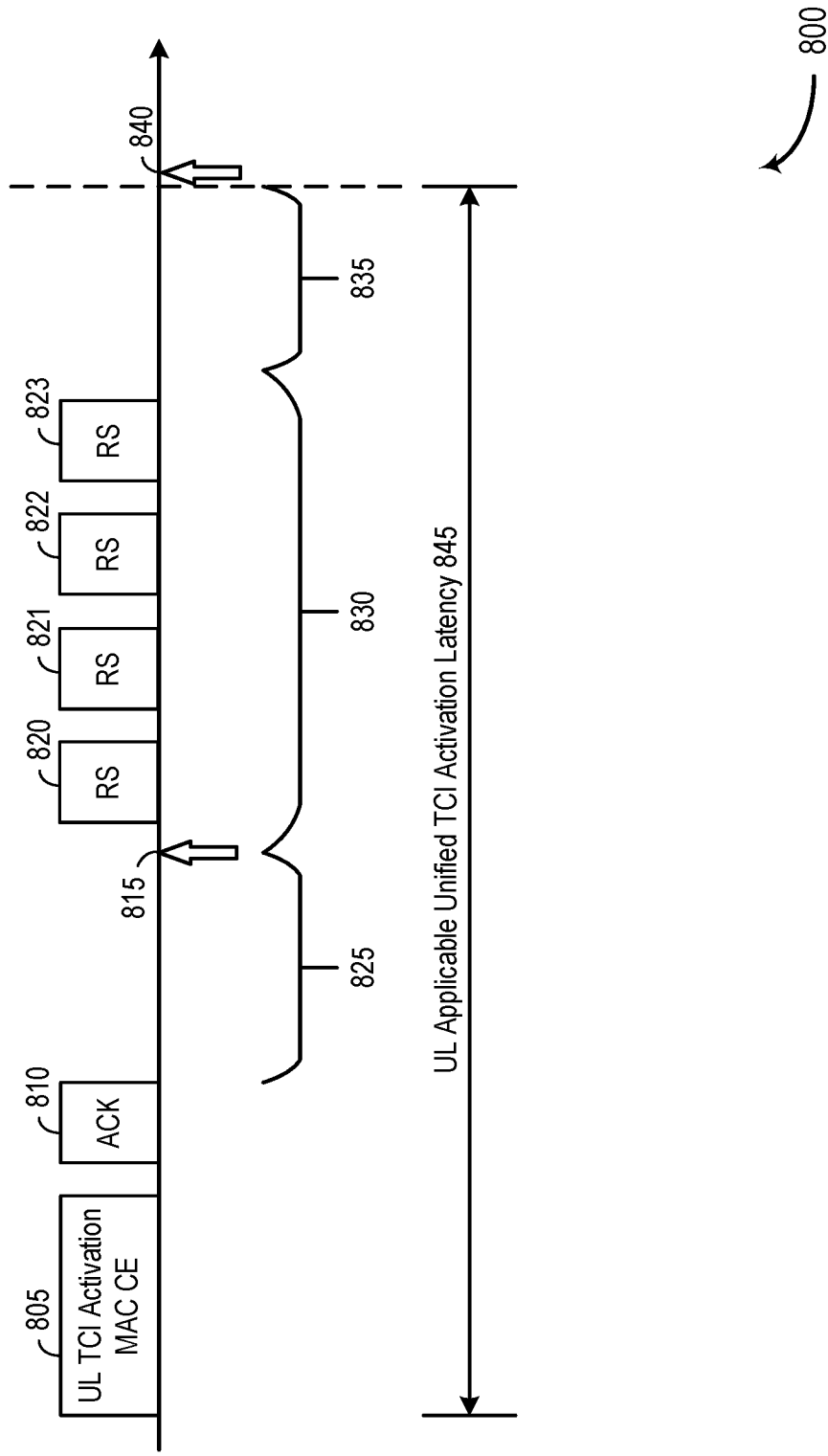
FIG. 8 depicts a timeline illustrating TCI activation delay.

FIG. 8 depicts a timeline 800 illustrating TCI activation delay, for example for uplink TCI communication.

Following the activation of a new cell for a UE, at 805, a network entity may transmit and the UE may receive a control message 805 that activates a set or list of TCI states, for example TCI states applicable to uplink communications, for use at the UE. The control message may be a MAC CE, as further discussed herein. The UE may respond to the network entity with an acknowledgement 810 responsive to the control message 805. After the set or list of TCI states is activated, following time 840 the network entity may use a DCI to select a TCI of the set or list of TCI states applicable to uplink.

According to some current techniques, the activation time may include a time duration 825 that is associated with a time duration prior to when the control message 805 (e.g., MAC CE) becomes applicable the UE at time 815. For uplink TCI states, the UE may need to monitor (receive, measure) pathloss reference signals associated with the uplink TCI state to estimate a pathloss of the uplink. The UE may estimate the pathloss to perform uplink power control. Different pathloss reference signals may be configured for different TCI states. For a TCI state, a pathloss reference signal may be an SSB or a CSI-RS that is QCLed with the TCI state. The UE may measure each pathloss reference multiple times, for example over multiple measurement occasions 820, 821, 822, and 823, to take an average of the measurement pathloss associate with the TCI state. As such, there may then be a time duration 830 from the time 815 until after the last of the measurement occasions, for example measurement occasion 823. There may then be a time duration 835 during which the UE processes the reference signals received in the multiple measurement occasions 820, 821, 822, and 823.

For multiple TCI states activated by the control message 805, there may be multiple different sets of measurement occasions. For example, each TCI state of the set of activated TCI states may be QCLed with different reference signals. The UE may then receive and measure reference signals on one or more different sets of measurement occasion, which may increase a duration of time duration 830.

In view of the above, the latency 845 for application of the activated set of TCI states (e.g., the uplink applicable unified TCI activation latency) may be relatively long. According to the techniques described herein, the latency 845 may be reduced or eliminated by applying transmission configuration indicator state set preconfiguration in candidate cells.

In some examples, following activation of a set of TCI states associated with a set of inactive candidate cells for the UE, the latency 745 or latency 845 may apply. A TCI state may be available for selection by a DCI from a network entity based on a maximum time of one of a cell selection command application time, or a time that includes the control message (e.g., MAC CE) activation delay and an additional time (e.g., a time to measure SSBs or pathloss reference signals, and the associated processing time). For example, the TCI state may be available for selection by a DCI based on a maximum time between the cell selection application to the new cell from the inactive candidate cells and the latency 745 or latency 845.

In other examples, the additional delay may be omitted, and the activated TCI state or states may be available and ready for DCI selection after the later one of the control message (e.g., MAC CE) activation delay and the cell selection command application time. For example, the cell selection command application time may be sufficiently long for the UE to measure reference signals, such as SSBs or pathloss reference signals, as described herein.

Example Operations of a User Equipment

Figure 9:
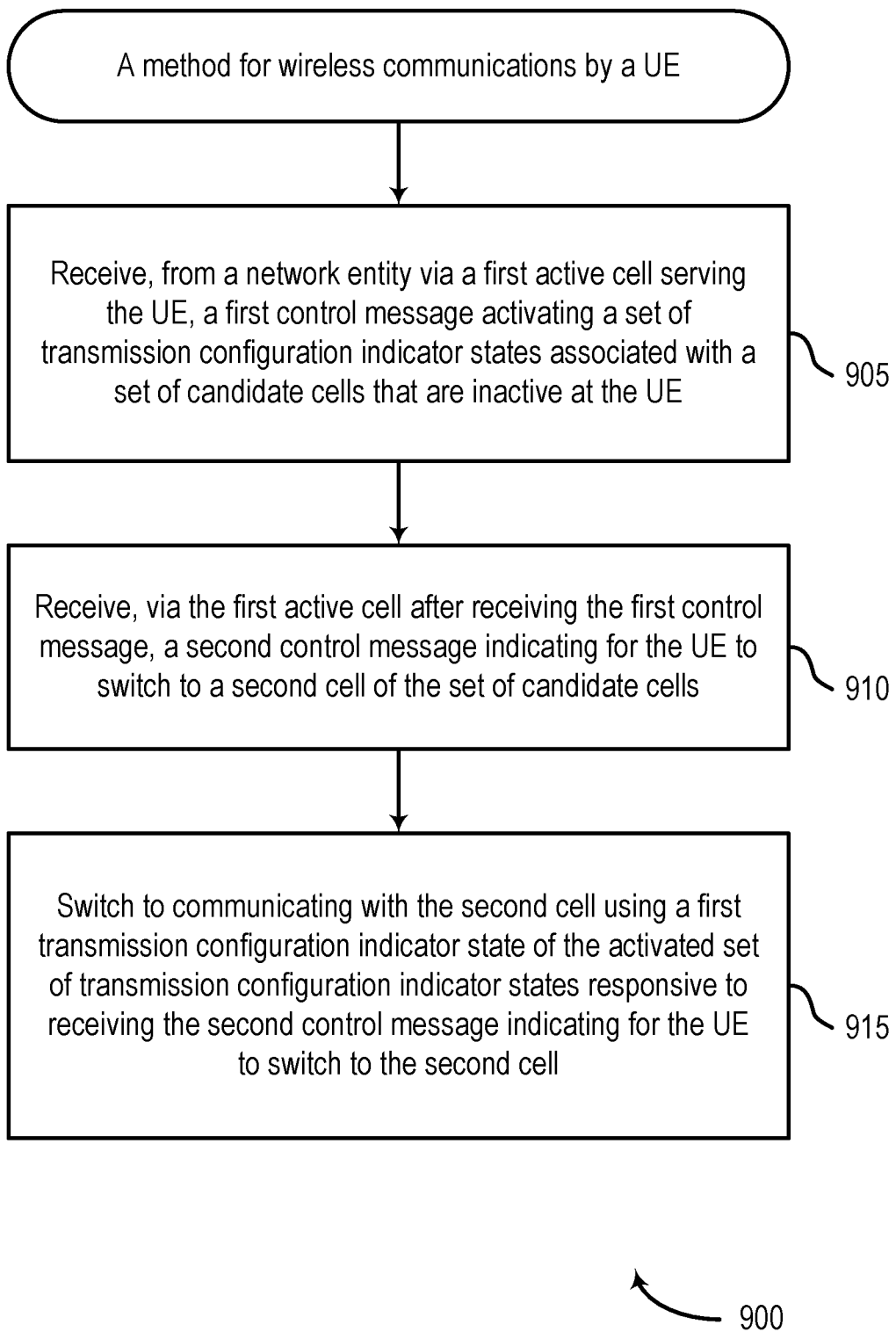
FIG. 9 depicts a method for wireless communications.

FIG. 9 shows an example of a method 900 for wireless communications by a UE, such as a UE 104 of FIGS. 1 and 3.

Method 900 begins at step 905 with receiving, from a network entity via a first active cell serving the UE, a first control message activating a set of transmission configuration indicator states associated with a set of candidate cells that are inactive at the UE. In some cases, the operations of this step refer to, or may be performed by, circuitry for receiving and/or code for receiving as described with reference to FIG. 11.

Method 900 then proceeds to step 910 with receiving, via the first active cell after receiving the first control message, a second control message indicating for the UE to switch to a second cell of the set of candidate cells. In some cases, the operations of this step refer to, or may be performed by, circuitry for receiving and/or code for receiving as described with reference to FIG. 11.

Method 900 then proceeds to step 915 with switching to communicating with the second cell using a first transmission configuration indicator state of the activated set of transmission configuration indicator states responsive to receiving the second control message indicating for the UE to switch to the second cell. In some cases, the operations of this step refer to, or may be performed by, circuitry for switching and/or code for switching as described with reference to FIG. 11.

In some aspects, the method 900 further includes receiving a downlink control information message indicating the first transmission configuration indicator state, wherein the UE communicates with the second cell using the first transmission configuration indicator state indicated by the downlink control information message. In some cases, the operations of this step refer to, or may be performed by, circuitry for receiving and/or code for receiving as described with reference to FIG. 11.

In some aspects, the method 900 further includes transmitting UE capability signaling indicating a quantity of transmission configuration indicator states for inactive candidate cells. In some cases, the operations of this step refer to, or may be performed by, circuitry for transmitting and/or code for transmitting as described with reference to FIG. 11.

In some aspects, the method 900 further includes transmitting, to the network entity, UE capability signaling indicating a quantity of transmission configuration indicator states for activated cells that is separate from the quantity of transmission configuration indicator states for inactive candidate cells. In some cases, the operations of this step refer to, or may be performed by, circuitry for transmitting and/or code for transmitting as described with reference to FIG. 11.

In some aspects, the method 900 further includes transmitting, to the network entity, UE capability signaling indicating a quantity of transmission configuration indicator states for both activated cells and inactive candidate cells. In some cases, the operations of this step refer to, or may be performed by, circuitry for transmitting and/or code for transmitting as described with reference to FIG. 11.

In some aspects, the activated set of transmission configuration indicator states corresponds to a bandwidth part.

In some aspects, the method 900 further includes receiving, in the first control message, an indication of the bandwidth part that corresponds to the set of transmission configuration indicator states. In some cases, the operations of this step refer to, or may be performed by, circuitry for receiving and/or code for receiving as described with reference to FIG. 11.

In some aspects, the method 900 further includes determining the bandwidth part that corresponds to the activated set of transmission configuration indicator states based at least in part on a default bandwidth part for the second cell. In some cases, the operations of this step refer to, or may be performed by, circuitry for determining and/or code for determining as described with reference to FIG. 11.

In some aspects, the method 900 further includes performing, before communicating with the second cell and for each transmission configuration indicator state of the activated set of transmission configuration indicator states, a measurement procedure for one or more reference signals quasi co-located with the transmission configuration indicator state, wherein the UE communicates via the second cell based at least in part on the measurement procedure for the one or more reference signals quasi co-located with the first transmission configuration indicator state. In some cases, the operations of this step refer to, or may be performed by, circuitry for performing and/or code for performing as described with reference to FIG. 11.

In some aspects, the method 900 further includes transmitting UE capability signaling indicating a quantity of reference signal measurements for the measurement procedure. In some cases, the operations of this step refer to, or may be performed by, circuitry for transmitting and/or code for transmitting as described with reference to FIG. 11.

In some aspects, the method 900 further includes determining whether the first transmission configuration indicator state is available for selection via a downlink control information message based at least in part on a later time of a transmission configuration indicator activation time or a cell selection command application time. In some cases, the operations of this step refer to, or may be performed by, circuitry for determining and/or code for determining as described with reference to FIG. 11.

In some aspects, the method 900 further includes determining, for each cell of the set of candidate cells, a power metric for a set of beamformed reference signals associated with the cell. In some cases, the operations of this step refer to, or may be performed by, circuitry for determining and/or code for determining as described with reference to FIG. 11.

In some aspects, the method 900 further includes selecting a subset of cells of the set of candidate cells based at least in part on the power metric for the set of beamformed reference signals. In some cases, the operations of this step refer to, or may be performed by, circuitry for selecting and/or code for selecting as described with reference to FIG. 11.

In some aspects, the method 900 further includes transmitting a report indicating, for each cell of the selected subset of cells, a received power associated with one or more of the set of beamformed reference signals associated with the cell. In some cases, the operations of this step refer to, or may be performed by, circuitry for transmitting and/or code for transmitting as described with reference to FIG. 11.

In some aspects, the power metric comprises a linear average of power measurements for a threshold quantity of the set of beamformed reference signals, or a tail percentage of power measurements for a threshold quantity of the set of beamformed reference signals.

In some aspects, the method 900 further includes identifying a ranked order for the set of candidate cells based at least in part on the power metric for the set of beamformed reference signals, wherein the subset of cells is selected based at least in part on a threshold quantity of cells and the ranked order. In some cases, the operations of this step refer to, or may be performed by, circuitry for identifying and/or code for identifying as described with reference to FIG. 11.

In some aspects, the report is transmitted based at least in part on the UE identifying a trigger condition is met.

Figure 11:
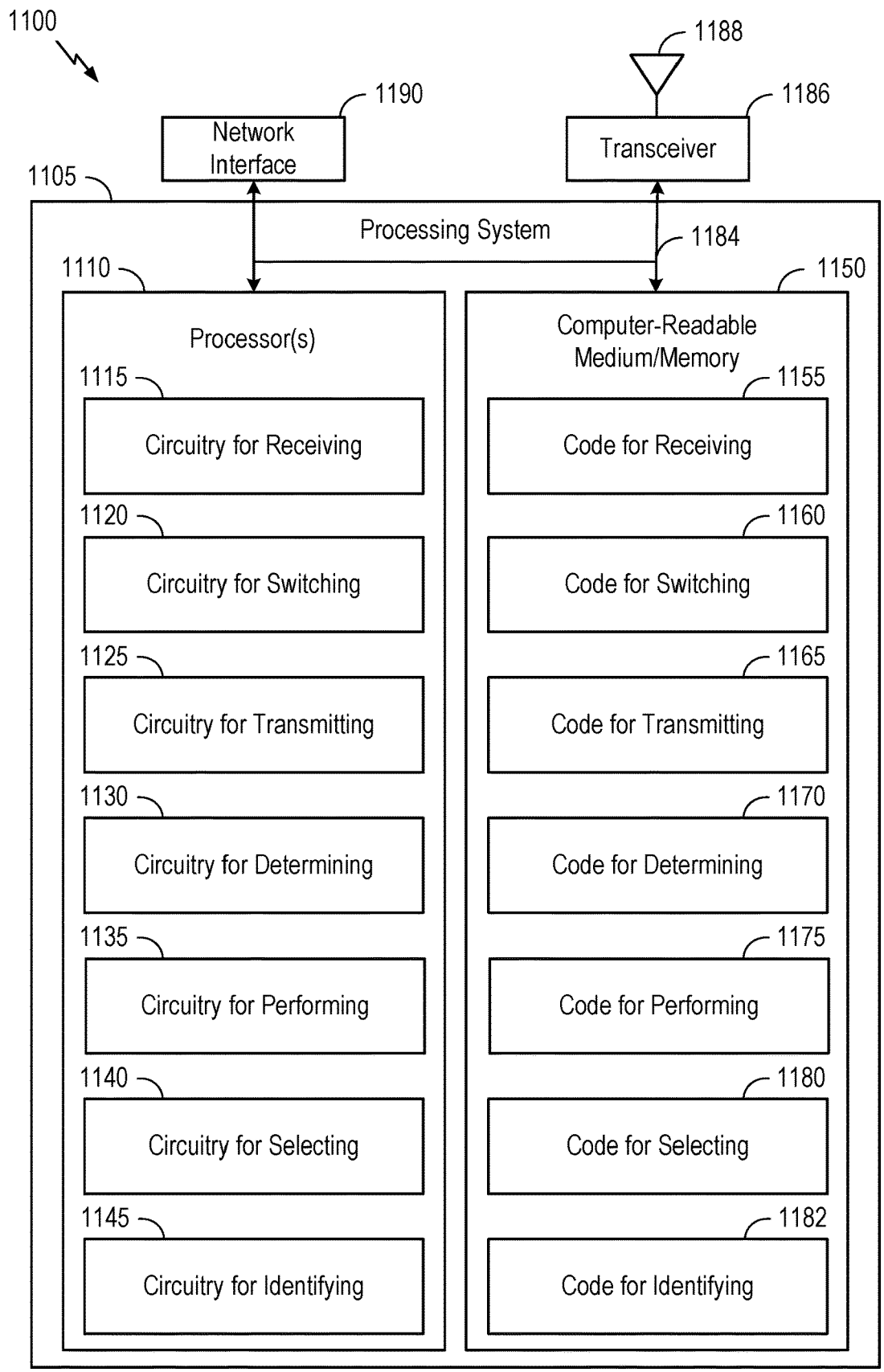
FIG. 11 depicts aspects of an example communications device.

In one aspect, method 900, or any aspect related to it, may be performed by an apparatus, such as communications device 1100 of FIG. 11, which includes various components operable, configured, or adapted to perform the method 900. Communications device 1100 is described below in further detail.

Note that FIG. 9 is just one example of a method, and other methods including fewer, additional, or alternative steps are possible consistent with this disclosure.

Example Operations of a Network Entity

Figure 10:
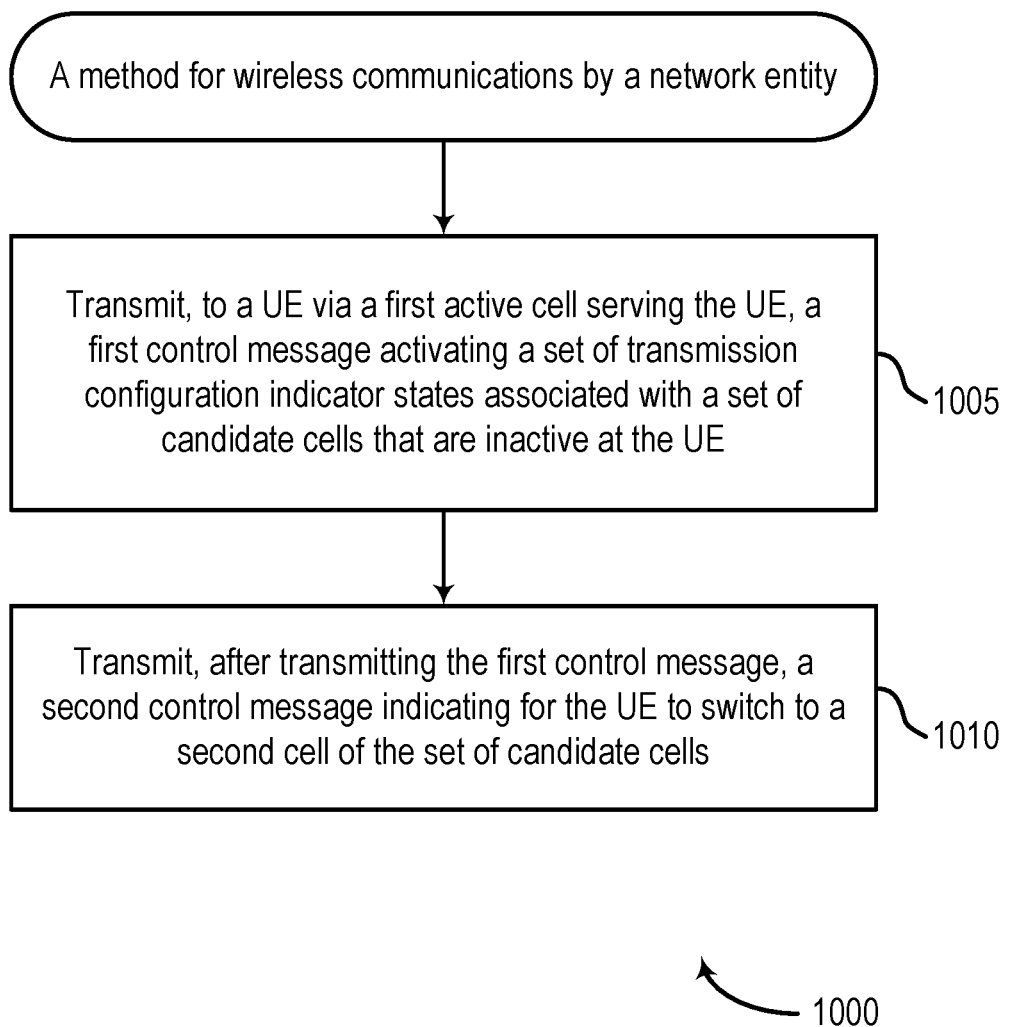
FIG. 10 depicts a method for wireless communications.

FIG. 10 shows an example of a method 1000 for wireless communications by a network entity, such as a BS 102 of FIGS. 1 and 3, or a disaggregated base station as discussed with respect to FIG. 2.

Method 1000 begins at step 1005 with transmitting, to a UE via a first active cell serving the UE, a first control message activating a set of transmission configuration indicator states associated with a set of candidate cells that are inactive at the UE. In some cases, the operations of this step refer to, or may be performed by, circuitry for transmitting and/or code for transmitting as described with reference to FIG. 11.

Method 1000 then proceeds to step 1010 with transmitting, after transmitting the first control message, a second control message indicating for the UE to switch to a second cell of the set of candidate cells. In some cases, the operations of this step refer to, or may be performed by, circuitry for transmitting and/or code for transmitting as described with reference to FIG. 11.

In some aspects, the method 1000 further includes transmitting, to the UE via the second cell, a downlink control information message indicating a first transmission configuration indicator state of the activated set of transmission configuration indicator states for the UE to use to communicates with the second cell. In some cases, the operations of this step refer to, or may be performed by, circuitry for transmitting and/or code for transmitting as described with reference to FIG. 11.

In some aspects, the method 1000 further includes receiving, from the UE, UE capability signaling indicating a quantity of transmission configuration indicator states for inactive candidate cells, the first control message transmitted at least in part in response to the received UE capability signaling. In some cases, the operations of this step refer to, or may be performed by, circuitry for receiving and/or code for receiving as described with reference to FIG. 11.

In some aspects, the method 1000 further includes receiving, from the UE, UE capability signaling indicating a quantity of transmission configuration indicator states for activated cells that is separate from the quantity of transmission configuration indicator states for inactive candidate cells. In some cases, the operations of this step refer to, or may be performed by, circuitry for receiving and/or code for receiving as described with reference to FIG. 11.

In some aspects, the method 1000 further includes receiving, from the UE, UE capability signaling indicating a quantity of transmission configuration indicator states for both activated cells and inactive candidate cells. In some cases, the operations of this step refer to, or may be performed by, circuitry for receiving and/or code for receiving as described with reference to FIG. 11.

In some aspects, the activated set of transmission configuration indicator states corresponds to a bandwidth part.

In some aspects, the method 1000 further includes transmitting, in the first control message, an indication of the bandwidth part that corresponds to the set of transmission configuration indicator states. In some cases, the operations of this step refer to, or may be performed by, circuitry for transmitting and/or code for transmitting as described with reference to FIG. 11.

In one aspect, method 1000, or any aspect related to it, may be performed by an apparatus, such as communications device 1100 of FIG. 11, which includes various components operable, configured, or adapted to perform the method 1000. Communications device 1100 is described below in further detail.

Note that FIG. 10 is just one example of a method, and other methods including fewer, additional, or alternative steps are possible consistent with this disclosure.

Example Communications Device

FIG. 11 depicts aspects of an example communications device 1100. In some aspects, communications device 1100 is a user equipment, such as UE 104 described above with respect to FIGS. 1 and 3. In some aspects, communications device 1100 is a network entity, such as BS 102 of FIGS. 1 and 3, or a disaggregated base station as discussed with respect to FIG. 2.

The communications device 1100 includes a processing system 1105 coupled to the transceiver 1186 (e.g., a transmitter and/or a receiver). In some aspects (e.g., when communications device 1100 is a network entity), processing system 1105 may be coupled to a network interface 1190 that is configured to obtain and send signals for the communications device 1100 via communication link(s), such as a backhaul link, midhaul link, and/or fronthaul link as described herein, such as with respect to FIG. 2. The transceiver 1186 is configured to transmit and receive signals for the communications device 1100 via the antenna 1188, such as the various signals as described herein. The processing system 1105 may be configured to perform processing functions for the communications device 1100, including processing signals received and/or to be transmitted by the communications device 1100.

The processing system 1105 includes one or more processors 1110. In various aspects, the one or more processors 1110 may be representative of one or more of receive processor 358, transmit processor 364, TX MIMO processor 366, and/or controller/processor 380, as described with respect to FIG. 3. In various aspects, one or more processors 1110 may be representative of one or more of receive processor 338, transmit processor 320, TX MIMO processor 330, and/or controller/processor 340, as described with respect to FIG. 3. The one or more processors 1110 are coupled to a computer-readable medium/memory 1150 via a bus 1184. In certain aspects, the computer-readable medium/memory 1150 is configured to store instructions (e.g., computer-executable code) that when executed by the one or more processors 1110, cause the one or more processors 1110 to perform: the method 900 described with respect to FIG. 9, or any aspect related to it; and/or the method 1000 described with respect to FIG. 10, or any aspect related to it. Note that reference to a processor performing a function of communications device 1100 may include one or more processors 1110 performing that function of communications device 1100.

In the depicted example, computer-readable medium/memory 1150 stores code (e.g., executable instructions), such as code for receiving 1155, code for switching 1160, code for transmitting 1165, code for determining 1170, code for performing 1175, code for selecting 1180, and code for identifying 1182. Processing of the code for receiving 1155, code for switching 1160, code for transmitting 1165, code for determining 1170, code for performing 1175, code for selecting 1180, and code for identifying 1182 may cause the communications device 1100 to perform: the method 900 described with respect to FIG. 9, or any aspect related to it; and/or the method 1000 described with respect to FIG. 10, or any aspect related to it.

The one or more processors 1110 include circuitry configured to implement (e.g., execute) the code stored in the computer-readable medium/memory 1150, including circuitry such as circuitry for receiving 1115, circuitry for switching 1120, circuitry for transmitting 1125, circuitry for determining 1130, circuitry for performing 1135, circuitry for selecting 1140, and circuitry for identifying 1145. Processing with circuitry for receiving 1115, circuitry for switching 1120, circuitry for transmitting 1125, circuitry for determining 1130, circuitry for performing 1135, circuitry for selecting 1140, and circuitry for identifying 1145 may cause the communications device 1100 to perform: the method 900 described with respect to FIG. 9, or any aspect related to it; and/or the method 1000 described with respect to FIG. 10, or any aspect related to it.

Various components of the communications device 1100 may provide means for performing: the method 900 described with respect to FIG. 9, or any aspect related to it; and/or the method 1000 described with respect to FIG. 10, or any aspect related to it. For example, means for transmitting, sending or outputting for transmission may include transceivers 354 and/or antenna(s) 352 of the UE 104 illustrated in FIG. 3, transceivers 332 and/or antenna(s) 334 of the BS 102 illustrated in FIG. 3, and/or the transceiver 1186 and the antenna 1188 of the communications device 1100 in FIG. 11. Means for receiving or obtaining may include transceivers 354 and/or antenna(s) 352 of the UE 104 illustrated in FIG. 3, transceivers 332 and/or antenna(s) 334 of the BS 102 illustrated in FIG. 3, and/or the transceiver 1186 and the antenna 1188 of the communications device 1100 in FIG. 11.

Example Clauses

Implementation examples are described in the following numbered clauses:

Clause 1: A method for wireless communications by a UE, comprising: receiving, from a network entity via a first active cell serving the UE, a first control message activating a set of transmission configuration indicator states associated with a set of candidate cells that are inactive at the UE; receiving, via the first active cell after receiving the first control message, a second control message indicating for the UE to switch to a second cell of the set of candidate cells; and switching to communicating with the second cell using a first transmission configuration indicator state of the activated set of transmission configuration indicator states responsive to receiving the second control message indicating for the UE to switch to the second cell.

Clause 2: The method of Clause 1, further comprising: receiving a downlink control information message indicating the first transmission configuration indicator state, wherein the UE communicates with the second cell using the first transmission configuration indicator state indicated by the downlink control information message.

Clause 3: The method of any one of Clauses 1 and 2, further comprising: transmitting UE capability signaling indicating a quantity of transmission configuration indicator states for inactive candidate cells.

Clause 4: The method of Clause 3, further comprising: transmitting, to the network entity, UE capability signaling indicating a quantity of transmission configuration indicator states for activated cells that is separate from the quantity of transmission configuration indicator states for inactive candidate cells.

Clause 5: The method of Clause 3, further comprising: transmitting, to the network entity, UE capability signaling indicating a quantity of transmission configuration indicator states for both activated cells and inactive candidate cells.

Clause 6: The method of any one of Clauses 1-5, wherein the activated set of transmission configuration indicator states corresponds to a bandwidth part.

Clause 7: The method of Clause 6, further comprising: receiving, in the first control message, an indication of the bandwidth part that corresponds to the set of transmission configuration indicator states.

Clause 8: The method of Clause 6, further comprising: determining the bandwidth part that corresponds to the activated set of transmission configuration indicator states based at least in part on a default bandwidth part for the second cell.

Clause 9: The method of any one of Clauses 1-8, further comprising: performing, before communicating with the second cell and for each transmission configuration indicator state of the activated set of transmission configuration indicator states, a measurement procedure for one or more reference signals quasi co-located with the transmission configuration indicator state, wherein the UE communicates via the second cell based at least in part on the measurement procedure for the one or more reference signals quasi co-located with the first transmission configuration indicator state.

Clause 10: The method of Clause 9, further comprising: transmitting UE capability signaling indicating a quantity of reference signal measurements for the measurement procedure.

Clause 11: The method of any one of Clauses 1-10, further comprising: determining whether the first transmission configuration indicator state is available for selection via a downlink control information message based at least in part on a later time of a transmission configuration indicator activation time or a cell selection command application time.

Clause 12: The method of any one of Clauses 1-11, further comprising: determining, for each cell of the set of candidate cells, a power metric for a set of beamformed reference signals associated with the cell; selecting a subset of cells of the set of candidate cells based at least in part on the power metric for the set of beamformed reference signals; and transmitting a report indicating, for each cell of the selected subset of cells, a received power associated with one or more of the set of beamformed reference signals associated with the cell.

Clause 13: The method of Clause 12, wherein the power metric comprises a linear average of power measurements for a threshold quantity of the set of beamformed reference signals, or a tail percentage of power measurements for a threshold quantity of the set of beamformed reference signals.

Clause 14: The method of Clause 12, further comprising: identifying a ranked order for the set of candidate cells based at least in part on the power metric for the set of beamformed reference signals, wherein the subset of cells is selected based at least in part on a threshold quantity of cells and the ranked order.

Clause 15: The method of Clause 12, wherein the report is transmitted based at least in part on the UE identifying a trigger condition is met.

Clause 16: A method for wireless communications by a network entity, comprising: transmitting, to a UE via a first active cell serving the UE, a first control message activating a set of transmission configuration indicator states associated with a set of candidate cells that are inactive at the UE; and transmitting, after transmitting the first control message, a second control message indicating for the UE to switch to a second cell of the set of candidate cells.

Clause 17: The method of Clause 16, further comprising: transmitting, to the UE via the second cell, a downlink control information message indicating a first transmission configuration indicator state of the activated set of transmission configuration indicator states for the UE to use to communicates with the second cell.

Clause 18: The method of any one of Clauses 16 and 17, further comprising: receiving, from the UE, UE capability signaling indicating a quantity of transmission configuration indicator states for inactive candidate cells, the first control message transmitted at least in part in response to the received UE capability signaling.

Clause 19: The method of Clause 18, further comprising: receiving, from the UE, UE capability signaling indicating a quantity of transmission configuration indicator states for activated cells that is separate from the quantity of transmission configuration indicator states for inactive candidate cells.

Clause 20: The method of Clause 18, further comprising: receiving, from the UE, UE capability signaling indicating a quantity of transmission configuration indicator states for both activated cells and inactive candidate cells.

Clause 21: The method of any one of Clauses 16-20, wherein the activated set of transmission configuration indicator states corresponds to a bandwidth part.

Clause 22: The method of Clause 21, further comprising: transmitting, in the first control message, an indication of the bandwidth part that corresponds to the set of transmission configuration indicator states.

Clause 23: An apparatus, comprising: a memory comprising executable instructions; and a processor configured to execute the executable instructions and cause the apparatus to perform a method in accordance with any one of Clauses 1-22.

Clause 24: An apparatus, comprising means for performing a method in accordance with any one of Clauses 1-22.

Clause 25: A non-transitory computer-readable medium comprising executable instructions that, when executed by a processor of an apparatus, cause the apparatus to perform a method in accordance with any one of Clauses 1-22.

Clause 26: A computer program product embodied on a computer-readable storage medium comprising code for performing a method in accordance with any one of Clauses 1-22.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communications by a user equipment (UE), comprising:
receiving, via a first active cell serving the UE, a first control message activating a set of transmission configuration indicator states associated with a set of candidate cells that are inactive at the UE;
receiving, via the first active cell after receiving the first control message, a second control message indicating for the UE to switch to a second cell of the set of candidate cells;
switching to communicating with the second cell using a first transmission configuration indicator state of the activated set of transmission configuration indicator states responsive to receiving the second control message indicating for the UE to switch to the second cell;
determining, for each cell of the set of candidate cells, a power metric for a set of beamformed reference signals associated with each cell of the set of candidate cells;
selecting a subset of cells of the set of candidate cells based at least in part on the power metric for the set of beamformed reference signals; and
transmitting a report indicating, for each cell of the selected subset of cells, a received power associated with one or more of the set of beamformed reference signals associated with each cell of the set of candidate cells.

2. The method of claim 1, further comprising:
receiving a downlink control information message indicating the first transmission configuration indicator state, wherein the UE communicates with the second cell using the first transmission configuration indicator state indicated by the downlink control information message.

3. The method of claim 1, further comprising:
transmitting UE capability signaling indicating a quantity of transmission configuration indicator states for inactive candidate cells.

4. The method of claim 3, further comprising:
transmitting UE capability signaling indicating a quantity of transmission configuration indicator states for activated cells that is separate from the quantity of transmission configuration indicator states for inactive candidate cells.

5. The method of claim 3, further comprising:
transmitting UE capability signaling indicating a quantity of transmission configuration indicator states for both activated cells and inactive candidate cells.

6. The method of claim 1, wherein the activated set of transmission configuration indicator states corresponds to a bandwidth part.

7. The method of claim 6, further comprising:
receiving, in the first control message, an indication of the bandwidth part that corresponds to the set of transmission configuration indicator states.

8. The method of claim 6, further comprising:
determining the bandwidth part that corresponds to the activated set of transmission configuration indicator states based at least in part on a default bandwidth part for the second cell.

9. The method of claim 1, further comprising:
performing, before communicating with the second cell and for each transmission configuration indicator state of the activated set of transmission configuration indicator states, a measurement procedure for one or more reference signals quasi co-located with the transmission configuration indicator state, wherein the UE communicates via the second cell based at least in part on the measurement procedure for the one or more reference signals quasi co-located with the first transmission configuration indicator state.

10. The method of claim 9, further comprising:
transmitting UE capability signaling indicating a quantity of reference signal measurements for the measurement procedure.

11. The method of claim 1, further comprising:
determining whether the first transmission configuration indicator state is available for selection via a downlink control information message based at least in part on a later time of a transmission configuration indicator activation time or a cell selection command application time.

12. The method of claim 1, wherein the power metric comprises a linear average of power measurements for a threshold quantity of the set of beamformed reference signals, or a tail percentage of power measurements for a threshold quantity of the set of beamformed reference signals.

13. The method of claim 1, further comprising:
identifying a ranked order for the set of candidate cells based at least in part on the power metric for the set of beamformed reference signals, wherein the subset of cells is selected based at least in part on a threshold quantity of cells and the ranked order.

14. The method of claim 1, wherein the report is transmitted based at least in part on the UE identifying a trigger condition is met.

15. A method for wireless communications by a network entity, comprising:
transmitting, to a user equipment (UE) via a first active cell serving the UE, a first control message activating a set of transmission configuration indicator states associated with a set of candidate cells that are inactive at the UE;
transmitting, after transmitting the first control message, a second control message indicating for the UE to switch to a second cell of the set of candidate cells; and
receiving, from the UE, a report indicating, for each cell of a selected subset of cells of the set of candidate cells, a received power associated with one or more of a set of beamformed reference signals associated with each cell of the set of candidate cells,
the subset of cells being selected based at least in part on the power metric for the set of beamformed reference signals.

16. The method of claim 15, further comprising:
transmitting, to the UE via the second cell, a downlink control information message indicating a first transmission configuration indicator state of the activated set of transmission configuration indicator states for the UE to use to communicates with the second cell.

17. The method of claim 15, further comprising:
receiving, from the UE, UE capability signaling indicating a quantity of transmission configuration indicator states for inactive candidate cells, the first control message transmitted at least in part in response to the received UE capability signaling.

18. The method of claim 17, further comprising:
receiving, from the UE, UE capability signaling indicating a quantity of transmission configuration indicator states for activated cells that is separate from the quantity of transmission configuration indicator states for inactive candidate cells.

19. The method of claim 17, further comprising:
receiving, from the UE, UE capability signaling indicating a quantity of transmission configuration indicator states for both activated cells and inactive candidate cells.

20. The method of claim 15, wherein the activated set of transmission configuration indicator states corresponds to a bandwidth part.

21. The method of claim 20, further comprising:
transmitting, in the first control message, an indication of the bandwidth part that corresponds to the set of transmission configuration indicator states.

22. An apparatus for wireless communication by a user equipment (UE), comprising:
a memory comprising executable instructions; and
a processor configured to execute the executable instructions and cause the apparatus to:
receive, via a first active cell serving the UE, a first control message activating a set of transmission configuration indicator states associated with a set of candidate cells that are inactive at the UE;
receive, via the first active cell after receiving the first control message, a second control message indicating for the UE to switch to a second cell of the set of candidate cells;
switch to communicating with the second cell using a first transmission configuration indicator state of the activated set of transmission configuration indicator states responsive to receiving the second control message indicating for the UE to switch to the second cell;
determine, for each cell of the set of candidate cells, a power metric for a set of beamformed reference signals associated with each cell of the set of candidate cells;
select a subset of cells of the set of candidate cells based at least in part on the power metric for the set of beamformed reference signals; and
transmit a report indicating, for each cell of the selected subset of cells, a received power associated with one or more of the set of beamformed reference signals associated with each cell of the set of candidate cells.

23. The apparatus of claim 22, wherein the processor is further configured to cause the apparatus to receive a downlink control information message indicating the first transmission configuration indicator state, wherein the UE communicates with the second cell using the first transmission configuration indicator state indicated by the downlink control information message.

24. The apparatus of claim 22, wherein the processor is further configured to cause the apparatus to transmit UE capability signaling indicating a quantity of transmission configuration indicator states for inactive candidate cells.

25. The apparatus of claim 22, wherein the activated set of transmission configuration indicator states corresponds to a bandwidth part.

26. The apparatus of claim 22, wherein the processor is further configured to cause the apparatus to perform, before communicating with the second cell and for each transmission configuration indicator state of the activated set of transmission configuration indicator states, a measurement procedure for one or more reference signals quasi co-located with the transmission configuration indicator state, wherein the UE communicates via the second cell based at least in part on the measurement procedure for the one or more reference signals quasi co-located with the first transmission configuration indicator state.

27. The apparatus of claim 22, wherein the processor is further configured to cause the apparatus to determine whether the first transmission configuration indicator state is available for selection via a downlink control information message based at least in part on a later time of a transmission configuration indicator activation time or a cell selection command application time.

28. An apparatus for wireless communication by a network entity, comprising:
- a memory comprising executable instructions; and
- a processor configured to execute the executable instructions and cause the apparatus to:
  - transmit, to a user equipment (UE) via a first active cell serving the UE, a first control message activating a set of transmission configuration indicator states associated with a set of candidate cells that are inactive at the UE;
  - transmit, after transmitting the first control message, a second control message indicating for the UE to switch to a second cell of the set of candidate cells; and
  - receive, from the UE, a report indicating, for each cell of a selected subset of cells of the set of candidate cells, a received power associated with one or more of a set of beamformed reference signals associated with each cell of the set of candidate cells,
  - the subset of cells being selected based at least in part on the power metric for the set of beamformed reference signals.

* * * * *